(12) United States Patent
Diepstraten

(10) Patent No.: US 12,377,485 B2
(45) Date of Patent: Aug. 5, 2025

(54) NOZZLE, SYSTEM AND METHOD

(71) Applicant: Illinois Tool Works Inc., Glenview, IL (US)

(72) Inventor: Gerjan Diepstraten, Dongen (NL)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 16/818,584

(22) Filed: Mar. 13, 2020

(65) Prior Publication Data

US 2021/0060678 A1 Mar. 4, 2021

(30) Foreign Application Priority Data

Aug. 27, 2019 (EP) ..................................... 19193941

(51) Int. Cl.
*B23K 3/08* (2006.01)
*B23K 1/00* (2006.01)
(Continued)

(52) U.S. Cl.
CPC .............. *B23K 3/08* (2013.01); *B23K 1/0016* (2013.01); *B23K 3/06* (2013.01); *B33Y 80/00* (2014.12); *B23K 2101/42* (2018.08)

(58) Field of Classification Search
CPC ..................................... B23K 3/06; B23K 3/08
See application file for complete search history.

(56) References Cited

U.S. PATENT DOCUMENTS 4,651,916 A * 3/1987 Ciniglio ............... B23K 3/0653
228/180.1
5,368,222 A * 11/1994 Scorta .................. B23K 3/0653
228/180.1
(Continued)

FOREIGN PATENT DOCUMENTS

CN 201115039 Y * 9/2008
DE 202011050852 9/2011
(Continued)

OTHER PUBLICATIONS

Extended European Search Report Appln No. 19193941.2 dated Mar. 25, 2020 (11 pgs.).
(Continued)

*Primary Examiner* — Devang R Patel
(74) *Attorney, Agent, or Firm* — McAndrews, Held & Malloy, Ltd.

(57) ABSTRACT

A nozzle for directing a stream of solder during a soldering operation is disclosed. The nozzle comprising a body portion having an inlet for receiving a supply of solder; an outlet portion having one or more outlets for dispensing solder therefrom; and at least one channel fluidly coupling the inlet to the one or more outlets. Therein the outlet portion is adapted to be arranged above the inlet, such that, in use, solder flows from the inlet to the outlet portion along the at least one channel in a generally upward direction. The outlet portion has first and second over-flow sections, each overflow section being integral with, or connected to, a peripheral edge of an outlet of the one or more outlets, such that in use, the solder is dispensed from an outlet of the one or more outlets and flows over the first and/or second over-flow section. At least a portion of the first over-flow section has a first width, such that in use, solder flowing over the first over-flow section produces a stream of solder with a width substantially corresponding to the first width. At least a portion of the second over-flow section has a second width, different to the first width, such that in use, solder flowing over the second over-flow section produces a stream of solder with a width substantially corresponding to the second width. A method of manufacturing a nozzle of this type and a method of soldering a component with a nozzle of this type are also disclosed.

20 Claims, 9 Drawing Sheets

(51) Int. Cl.
*B23K 3/06* (2006.01)
*B33Y 80/00* (2015.01)
*B23K 101/42* (2006.01)

(56) References Cited

U.S. PATENT DOCUMENTS

| | | | | |
|---|---|---|---|---|
| 6,742,693 | B2* | 6/2004 | Wang | B23K 3/0646 228/56.1 |
| 7,650,851 | B2* | 1/2010 | Tombs | B23K 1/085 118/423 |
| 8,590,765 | B2* | 11/2013 | Yoshino | H05K 3/3468 228/37 |
| 9,849,535 | B2* | 12/2017 | Hashimoto | B23K 3/0646 |
| 10,086,460 | B2 | 10/2018 | Colijn | |
| 2002/0162879 | A1 | 11/2002 | Schouten | |
| 2016/0184914 | A1 | 6/2016 | Völker | |
| 2018/0290225 | A1* | 10/2018 | Riegel | G05D 7/0617 |

FOREIGN PATENT DOCUMENTS

| | | | | |
|---|---|---|---|---|
| DE | 102014110720 | | 2/2016 | |
| GB | 2360237 | A * | 9/2001 | B23K 3/0653 |
| WO | 2011105034 | | 9/2011 | |
| WO | 2012143966 | | 10/2012 | |

OTHER PUBLICATIONS

Itw Eae: "Vitronics Soltec ZEVAm Selective Soldering System—Screenshot at 1:51", Mar. 27, 2017, XP055676322, Retrieved from the Internet: URL:https://www.youtube.com/watch?v=TtmiOOtGCcM (2 pgs).

Itw Eae: "Vitronics Soltec ZEVAm Selective Soldering System", Youtube, Mar. 27, 2017, XP054980300, Retrieved from the Internet: URL:https://www.youtube.com/watch?v=TtmiOOtGCcM (1 pg.).

Sms Group: "Engineering Fur Die Additive Ferti Gung", Jun. 20, 2019, XP055676595, Retrieved from the Internet: URL:https://www.sms-group.com/de/presse-medien/media/downloads/download-detail/30496 (2 pgs).

European Examination Report Appln No. 19193941.2 dated Sep. 15, 2023.

* cited by examiner

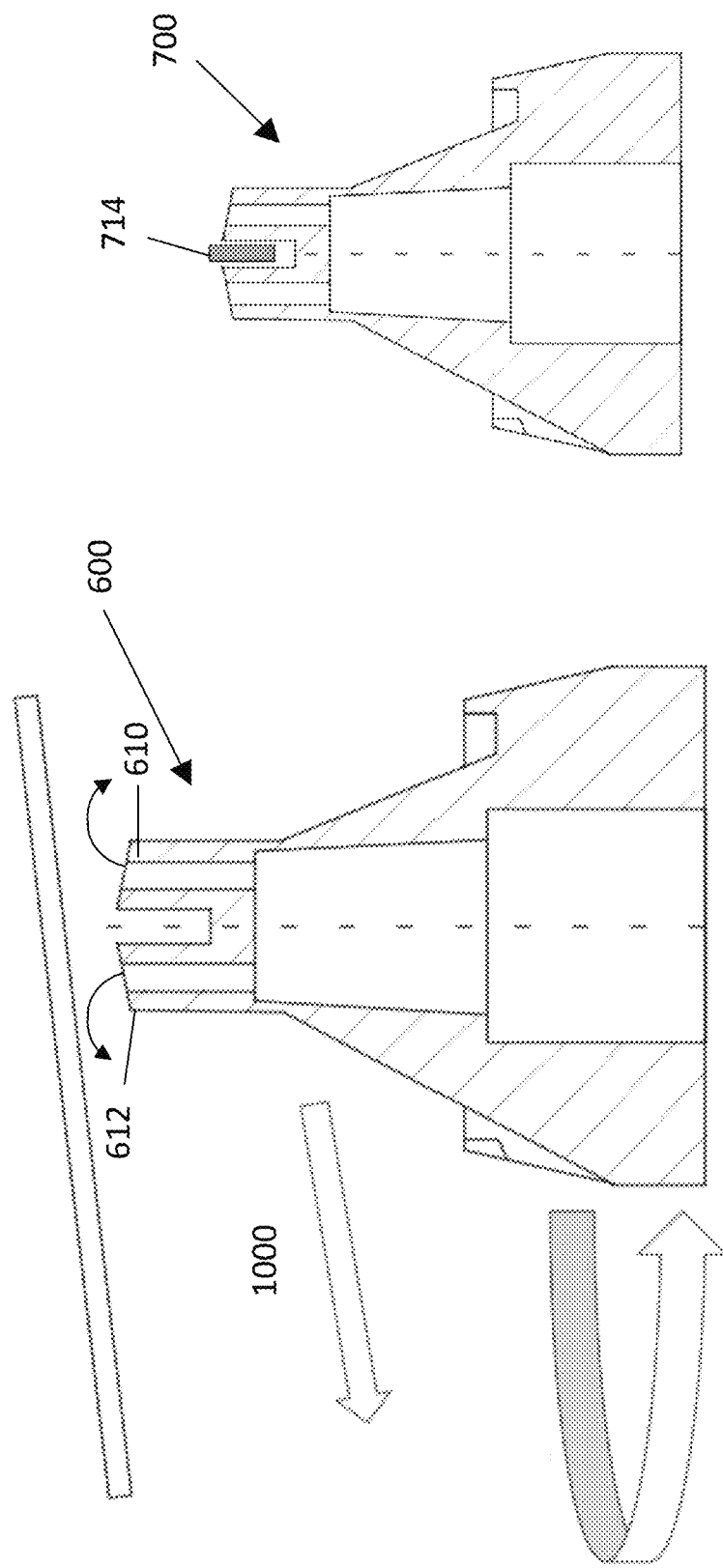

NOZZLE, SYSTEM AND METHOD

RELATED APPLICATIONS

The present application claims the benefit of European Patent Application No. EP19193941.2, filed Aug. 27, 2019, entitled "NOZZLE, SYSTEM AND METHOD." The entirety of European Patent Application No. EP19193941.2 is expressly incorporated herein by reference.

FIELD OF THE DISCLOSURE

The present disclosure relates to a nozzle and in particular, but not exclusively, a nozzle for directing a stream of solder during a soldering operation. The present disclosure relates to a method of soldering with the nozzle and a method of manufacturing the nozzle.

BACKGROUND

Selective soldering can be used in many soldering applications, for example soldering components of a Printed Circuit Board (PCB). Selective soldering can, in general, be differentiated into two methods: multi-wave dip soldering and point-to-point soldering.

In multi-wave dip soldering processes, typically a large solder pot, or soldering assembly 100 is used (as shown in FIG. 1a) having a plate 102 that includes nozzles 104 to which liquidus solder is pumped. The PCB (not shown) is lowered towards the nozzles, such that connector leads/pins (for example in a Cu—Copper —panel) are dipped into the liquidus solder present in the nozzle to form solder connections/joints at corresponding locations on the PCB. That is, multiple solder connections can be formed simultaneously. Each multi-wave dip soldering assembly has a specific nozzle plate with the nozzles being located at the required solder positions. The nozzles may have different shapes depending on the connectors to be soldered and the free space on the assembly. FIG. 1b illustrates a typical nozzle 104 used in a multi-wave dip soldering process. For connectors with a high risk of bridging, a laser-cut screen 106 (provided separately from the nozzle itself) may be provided in the nozzle 104 to help avoid bridging of solder.

In point-to-point soldering processes, typically a small solder pot, or soldering assembly 200 (as shown in FIG. 2), generally containing only one nozzle 204, is used. In contrast to multi-wave soldering where the connector pins are dipped into the nozzle, solder overflows from the nozzle 204 and the pin is dragged through or dipped into the flowing solder (or conversely the nozzle may be moved relative to the pin). Each solder joint is soldered separately. Some known point-to-point soldering assemblies include a Solder Drainage Conditioner (SDC) 213, which projects a jet or stream of de-bridging fluid towards the nozzle outlet and soldered pins to help prevent bridging of solder between adjacent soldered connections. Current SDCs can be bulky.

In point-to-point soldering, typically multiple solder pots are used, with a different nozzle size for each pot. For example a first nozzle may be a smaller nozzle to solder fine pitch components and a second nozzle may be a larger/wider nozzle to solder larger pitch components (for example double row components) in a single drag. The necessity of multiple solder pots/nozzles in this manner, can slow down production in that production must be stopped to switch between nozzles.

It would be advantageous to produce a nozzle that helps overcome the above described problems.

SUMMARY

According to a first aspect of the present disclosure there is provided a nozzle for directing a stream of solder during a soldering operation, the nozzle comprising:
  a body portion having:
    an inlet for receiving a supply of solder;
    an outlet portion having one or more outlets for dispensing solder therefrom; and
    at least one channel fluidly coupling the inlet to the one or more outlets;
  wherein the outlet portion is adapted to be arranged above the inlet, such that, in use, solder flows from the inlet to the outlet portion along the at least one channel in a generally upward direction,
  wherein the outlet portion has first and second over-flow sections, each over-flow section being integral with, or connected to, a peripheral edge of an outlet of the one or more outlets, such that in use, the solder is dispensed from an outlet of the one or more outlets and flows over the first and/or second over-flow section,
  wherein at least a portion of the first over-flow section has a first width, such that in use, solder flowing over the first over-flow section produces a stream of solder with a width substantially corresponding to the first width, and
  wherein at least a portion of the second over-flow section has a second width, different to the first width, such that in use, solder flowing over the second over-flow section produces a stream of solder with a width substantially corresponding to the second width.

Suitably, the first and second over-flow sections are integral with, or connected to, a common outlet.

Suitably, the outlet portion has first and second outlets.

Suitably, the first over-flow section is integral with, or connected to, the first outlet and wherein the second over-flow section is integral with, or connected to, the second outlet.

Suitably, the body portion comprises first and second channels, the first channel fluidly coupling the inlet to the first outlet, the second channel fluidly coupling the inlet to the second outlet.

Suitably, the first and/or second over-flow section comprises a substantially straight portion in the peripheral edge of the outlet of the one or more outlets.

Suitably, the first and/or second over-flow section comprises a recessed or stepped section within the peripheral edge of the outlet of the one or more outlets Suitably, the first and second over-flow sections are positioned on opposing sides of the outlet portion.

Suitably, the outlet portion has a third over-flow section integral with, or connected to, a peripheral edge of an outlet of the one or more outlets, wherein at least a portion of the third over-flow section has a third width, different from the first and second widths, such that in use solder flowing over the third over-flow section produces a stream of solder with a width substantially corresponding to the third width.

Suitably, the over-flow sections are spaced around a perimeter of the outlet portion.

Suitably, the nozzle comprises a plurality of stacked layers, provided so as to define the at least one channel.

Suitably, the stacked layers are deposited during an additive manufacturing, or 3D printing, process.

Suitably, the stacked layers comprises stainless steel or titanium.

According to a second aspect of the present disclosure there is provided a system for soldering a component, comprising
a supply of liquid solder;
a nozzle according to the first aspect of the disclosure;
a pump apparatus, configured to pump solder from the solder supply to the nozzle; and
actuating means configured to change the relative orientation between the nozzle and a component to be soldered.

Suitably, the nozzle having a longitudinal axis.

Suitably, the actuating means are configured to rotate the nozzle about its axis.

Suitably, the actuating means are configured to tilt the nozzle axis and/or the component to be soldered to change the angle therebetween.

According to a third aspect of the present disclosure there is provided a method of manufacturing a nozzle for directing a stream of solder during a soldering operation, the method comprising:
depositing layers of material in an additive manufacturing, or 3D printing, process to construct a nozzle according to the first aspect of the disclosure.

Suitably, the material is stainless steel or titanium.

According to a fourth aspect of the present disclosure there is provided a method of soldering a component, the method comprising:
providing a system according to the second aspect of the disclosure;
providing a component to be soldered;
selecting a preferred over-flow section based on the required width of solder;
adjusting the relative orientation between the nozzle and the component to be
soldered such that, during a soldering operation, the component will be
soldered using the stream of solder produced as solder flows over the
preferred over-flow section; and
performing a soldering operation.

Suitably, the component is a printed circuit board.

Suitably, the relative orientation between the nozzle and the component to be soldered is adjusted by rotating the nozzle about its axis.

Suitably, the relative orientation between the nozzle and the component to be soldered is adjusted by tilting the nozzle axis and/or the component to be soldered to change the angle therebetween.

Suitably, the method further includes the steps:
selecting another preferred over-flow section based on another required width of solder;
adjusting the relative orientation between the nozzle and the component to be soldered such that, during a soldering operation, the component will be soldered using the stream of solder produced as solder flows over the another preferred over-flow section; and
performing a further soldering operation.

Certain embodiments of the disclosure provide the advantage that a nozzle for directing a stream of solder during a soldering operation is provided, which can be used to produce streams of solder of different widths. As such, the necessity for switching between nozzles during a soldering operation is reduced or removed entirely. This helps provide a quicker more efficient soldering process, with fewer delays.

Certain embodiments of the disclosure provide the advantage that a method of soldering a component is provided, that leads to less delays in production than known methods.

As used herein, when referring to 'solder' in use within a nozzle, it is to be understood that the solder is in a liquid state.

As used herein, it is to be understood that 'a peripheral edge of an outlet', is an edge defining the boundary, or mouth, of the outlet. The peripheral edge may be considered to be a single, continuous, edge bounding the outlet or multiple edges that connect/join to define the outlet.

As used herein, it is to be understood that the 'axis of the nozzle' refers to the longitudinal axis of the nozzle (i.e. the axis of the nozzle that is generally co-axial with the direction of solder flow). In the described examples the nozzle axis generally corresponds with the channel of the nozzle (i.e. the axis generally extends substantially vertically in use).

As used herein, it is to be understood that an 'over-flow section' is a section of a structure (for example an outlet portion or outlet) over which solder flows as the solder 'over-flows' from a nozzle outlet. The over-flow section may be an edge (for example a peripheral edge of the outlet), a section of the edge, or a surface connected to the edge. In other words, for a nozzle arranged such that solder flows in a generally upward direction towards, and subsequently from, an outlet, solder flows from (i.e. is dispensed from) the nozzle outlet, flows over an over-flow section (levelling out before, after or during flow over the over-flow section) before flowing in a generally downwardly direction along (or adjacent to) an exterior surface of the nozzle (i.e. due to gravity). In general, the connector pin to be soldered is dragged through or dipped into the flowing solder after the solder has flowed at least partially over the over-flow section.

As used herein, it is to be understood that 'the width of the over-flow section' generally refers to a dimension of the over-flow section (i.e. the edge, edge section or surface) that is transverse or perpendicular to the flow of solder thereover. It would be understood that 'the width of the over-flow section' may be a width of only a part of the over-flow section. For example, the over-flow section may include a surface, having a width dimension that converges towards a mouth portion. For a curved edge, or spout, as an over-flow section, the width may be the distance between the end points of the curved edge.

As used herein, it is to be understood that a width of an over-flow section may be configured 'such that in use, solder flowing over the over-flow section produces a stream of solder with a width substantially corresponding to the width of the over-flow section' by guiding or constraining the flow of solder thereover. In a most general sense, the flow of solder may be guided or restrained due to the surface tension of the solder on the over-flow section. For example, when the over-flow section is an edge (in particular an edge angled between adjacent, adjoining, edges), the surface tension of the solder flowing over the edge may help ensure the solder substantially flows over the edge only (i.e. rather than spilling onto adjacent edges). In other examples, the over-flow section may guide or restrain the flow of solder thereover, through the use of a physical barrier, which defines the width of the over-flow section (i.e. defines the end points of the over-flow section) to thereby channel the flow of solder to a certain width.

As used herein, it is to be understood that the phrase 'tilt' is used to describe a change in inclination or angling of a feature/component relative to a datum plane or another feature/component. For example, a PCB may be tilted relative to a horizontal plane. That is, an angle between the plane of the PCB and a horizontal plane may be increased or decreased. As another example, a PCB may be tilted relative to a soldering nozzle (or vice versa). That is, an angle between the plane of the PCB and the nozzle axis may be increased or decreased.

BRIEF DESCRIPTION OF THE DRAWINGS

Embodiments of the disclosure are further described hereinafter with reference to the accompanying drawings, in which:

FIGS. 10a and 10b illustrate the nozzle of FIG. 8 during soldering operations;

FIG. 15 illustrates a cross-sectional view of another example of a nozzle for directing a stream of solder during a solder operation.

In the drawings like reference numerals refer to like parts.

DETAILED DESCRIPTION

Figure 1A:
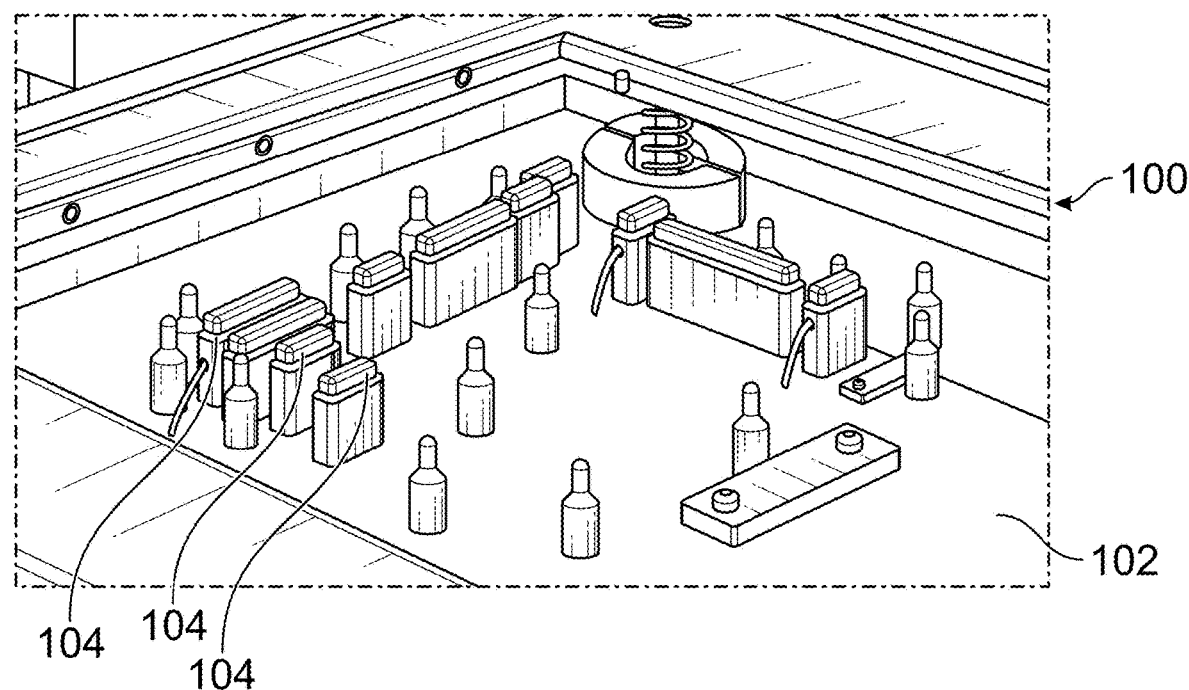
FIGS. 1a and 1b illustrates a perspective view of a solder pot and a nozzle (respectively) for use in multi-wave dip soldering processes.
Figure 1B:
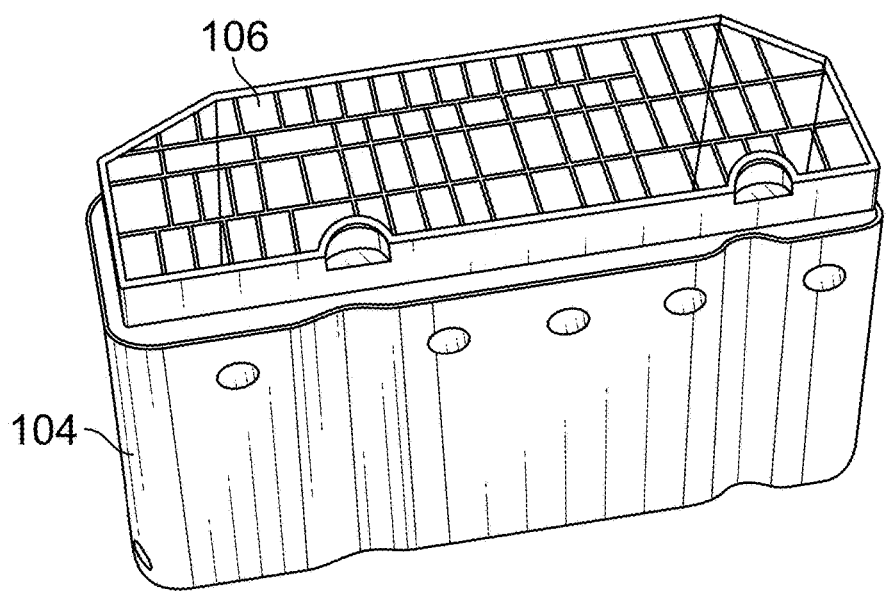
Figure 2:
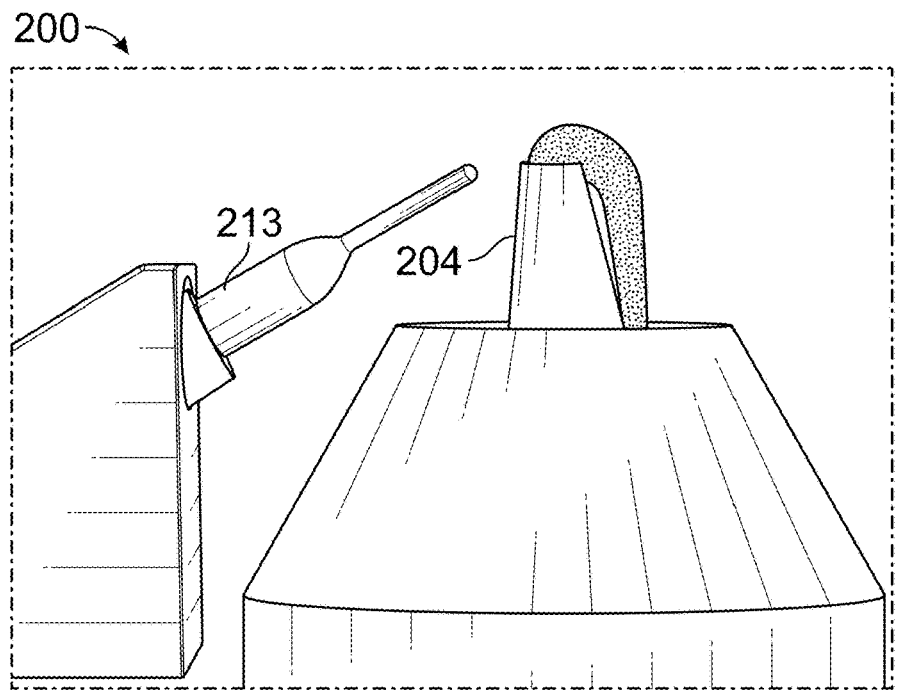
FIG. 2 illustrates a side view of a solder pot for use point-to-point soldering processes.
Figure 3:
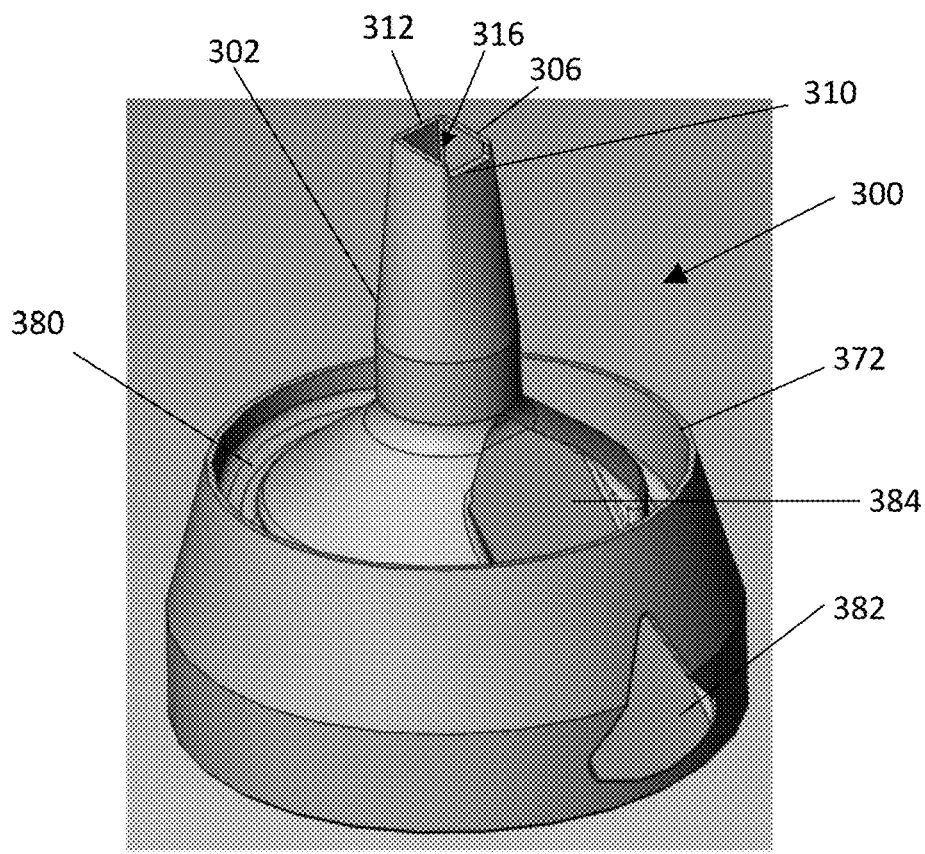
FIGS. 3 to 5 illustrate perspective views of an example of a nozzle for directing a stream of solder during a soldering operation.
Figure 4:
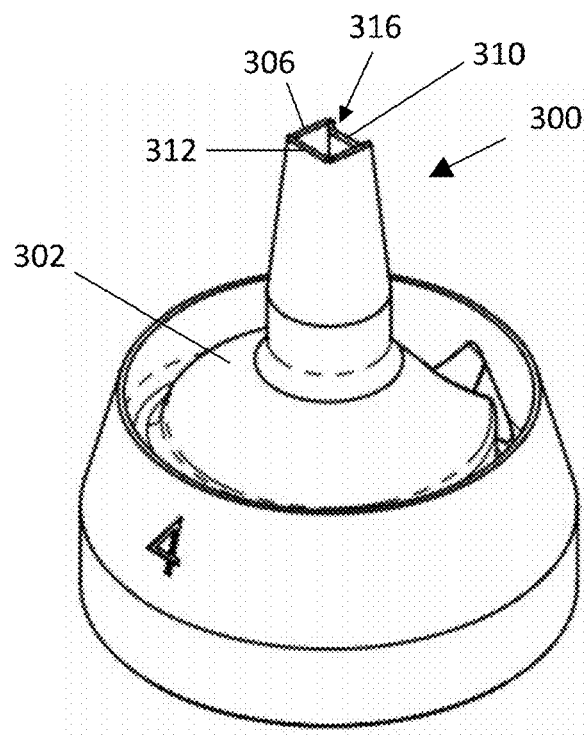
Figure 5:
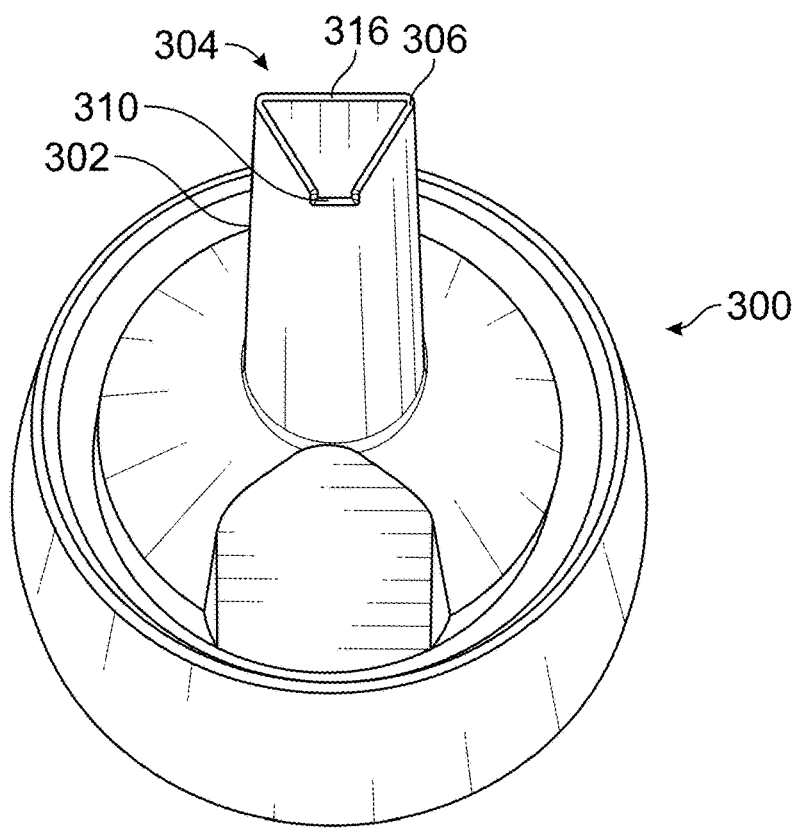

FIGS. 3 to 6 illustrate an example embodiment of a nozzle 300 of the present disclosure for directing a stream of solder during a soldering operation. The nozzle 300 includes a body portion 302 having an inlet 304 for receiving a supply of solder.

The body portion 302 further includes an outlet portion having an outlet 316 for dispensing solder therefrom. The body portion 302 further includes a channel 314 fluidly coupling the inlet 304 to the outlet 316. In this example, the inlet 304 is located at a first end of the body portion 302 and the outlet 316 is located at a second, opposing, end of the body portion 302.

In this example, the channel 314 has a larger/wider mouth portion, corresponding to the inlet 304, and generally tapers towards the narrower outlet 316. In this example, the exterior profile of the nozzle 300 corresponds to the channel 314 (that is with a larger/wider base that tapers towards a narrower outlet portion). However, in other examples the channel 314 and nozzle outer profile may have any suitable shape/sizes/profile.

The outlet portion (i.e. outlet 316) is adapted to be arranged above the inlet 304, such that, in use, solder flows from the inlet 304 to the outlet 316 along the channel 314 in a generally upward direction. In other words, in use, the nozzle is arranged such that solder, flows from the inlet 304 to the outlet 316 and 'over-flows' therefrom. In this example, in use, the nozzle 300 is arranged vertically (i.e. with the outlet 316 positioned directly above the inlet 304), however in other examples, the nozzle 300 may be tilted slightly.

The outlet 316 is defined by a peripheral edge 306. In other words, a peripheral edge defines the boundary of the outlet 316. The outlet 316 has first and second over-flow sections 310, 312. In this example, each over-flow section 310, 312 is integral with the peripheral edge of the outlet 316. That is, the over-flow sections 310, 312 are sections of the peripheral edge of the outlet 316. In this example, the first and second over-flow sections 310, 312 are substantially straight portions in the peripheral edge of the outlet of the one or more outlets, although in other examples the over-flow sections may correspond to portions in a curved peripheral edge. In this example, the first and second over-flow sections 310, 312 are angled with respect to adjacent portions of the peripheral edge.

The solder is dispensed from the outlet 316 and flows over one or both of the first and second over-flow sections 310, 312. In some examples, the solder may be dispensed over both over-flow sections 310, 312 simultaneously, producing two distinct solder streams. In other examples, the solder may be dispensed over one over-flow section preferentially, for example if the flow path up to and over said over-flow section has lower resistance (for example due to having an outlet sloped towards a particular over-flow section, such as the example of FIGS. 3 to 6 where solder flows over over-flow section 310 preferentially when the nozzle is arranged vertically). In such examples, the nozzle may need to be tilted from vertical to allow for flow over the non-preferential over-flow section.

The first over-flow section 310 has a first width. In other words, the first over-flow section 310 has a width dimension, transverse to the flow of solder thereover. The width of the first over-flow section 310 is such that in use solder flowing over the first over-flow section produces a stream of solder with a width substantially corresponding to the first width (of the first over-flow section 310). Similarly, the second over-flow section 312 has a second width, such that in use solder flowing over the second over-flow section 312 produces a stream of solder with a width substantially corresponding to the second width. The width of the second over-flow section 312 is different to the width of the first over-flow section 310. In other words, the first and second over-flow sections 310, 312 are sized such that when the solder is dispensed from the output they produce distinct streams of solder having different widths.

The over-flow sections may have any suitable width according to the required usage. In this example, the first overflow section 310 may have a width of from about 1 mm to 4 mm, aptly 2 mm, and the second overflow section 312 may have a width of from about 4 mm to 10 mm, aptly 6 mm.

In this example, the first and second over-flow sections 310, 312 are positioned on opposing, or opposite, sides of the outlet portion (in this case simply the outlet 316). However, in other examples, the over-flow sections 310, 312 may be separated around the outlet 316 or outlet portion by other amounts, for example the over-flow sections may be arranged such that the streams of solder that flow thereover are angled by from about 30 to 160 degrees, aptly from about 40 to 100 degrees.

In this example, the first over-flow section 310 includes a recessed or stepped section within the peripheral edge 306 of the outlet 316. That is, the first over-flow section 310 is recessed downwardly from adjacent portions of the peripheral edge 306. Such a recessed or stepped section may provide a definite boundary within which the stream of solder is guided to produce a stream of a particular width. In other examples, both or neither of the over-flow sections 310, 312 may include recessed or stepped sections within the peripheral edge.

In this example, the exterior surface of the nozzle 300 includes at least one guiding portion configured to guide solder dispensed from the outlet 316. The guiding portion may be a channel, groove, flat guiding surface or similar.

In this example, the body portion 302 of the nozzle 300 is surrounded by a side wall portion 372. At the junction between the body portion 302 and the raised wall portion 372 is defined a first guiding portion, channel 380 configured to guide solder dispensed from the outlet 316. The channel 380 extends around an exterior surface of the nozzle 300 and guides the over-flowing liquid solder back into the supply of liquid solder (i.e. a solder pot or reservoir). In other words, the channel portion 380 is configured to function as a gutter, positioned around body portion 302 of the nozzle 300 to guide the solder smoothly back to the solder supply.

The solder may, for example, be guided back to the solder supply through an opening 382 in the side wall portion 382 of the channel portion 380.

In this example, the nozzle 300 includes a second guiding portion, guiding surface 384. In this example the guiding surface 384 is a flat section on the body portion 302 that extends longitudinally along the exterior of the nozzle 300. In this example, the guiding surface 384 is longitudinally aligned with (i.e. extends downwardly from) the over-flow section 310. As such, as the solder flows over the over-flow section 310, the solder may flow downwardly along the guiding surface back to the solder supply. It would be understood that nozzle 300 may include a guiding surface extending from both over-flow sections.

The nozzle of FIGS. 3 to 6 is configured for use in a system for soldering a component, the system further including a supply of liquid solder, a pump apparatus, configured to pump solder from the solder supply to the nozzle (or more specifically to the outlet portion/outlet of the nozzle). The system may, for example, be of a type known in the art, for example a Vitrionics Soltec ZEVAm.

In this example, the system is used to solder a component, for example a Printed Circuit Board (PCB).

In some examples, the system may include a conveyor system configured to support and move the PCB from a first, loading non-soldering position, to a soldering position (for example at a soldering station within the system). Any suitable conveyor system may be used, for example a pin support chain.

Once in the soldering position, a soldering operation may be performed. During the solder operation, solder is pumped to the nozzle outlet such that it over-flows therefrom. The connector pin is then dragged through or dipped into the over-flowing solder corresponding to one of the over-flow sections (or conversely the nozzle may be moved relative to the connector pins of the PCB). In other words, during the soldering operation, the nozzle, the PCB, or both, are movable relative to one another (i.e. the relative position between the nozzle and the PCB is adjusted).

When soldering a particular section of the PCB, with specific requirements on the width of solder required, a preferred over-flow section may be selected based on the required width of solder. In other words, the over-flow section which produces a solder stream of a preferred width is selected. During the soldering operation the connector pin of the PCB can then be dragged or dipped into said solder stream.

Selection may be undertaken by a controller of the system. The controller may base the selection on information based on pre-programmed information. For example, the controller may include (or have access to) a memory, which includes information related to the preferred width of solder stream for the particular section of the PCB.

In some examples, an additional identification/determination step may precede the selection step. That is, information relating to the PCB (specifically, the particular section of the PCB) may be identified or determined, for example through visual inspection of the PCB. The selection step may then be based on this identified/determined information.

Figure 7A:
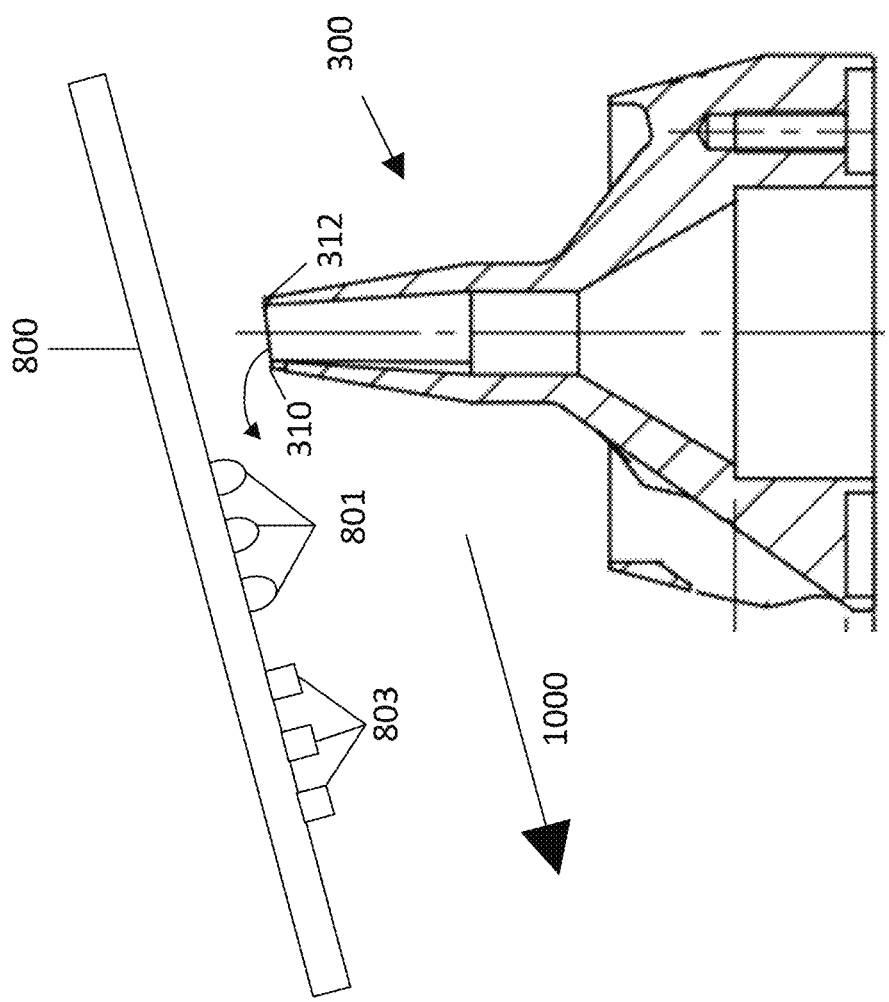
FIGS. 7a and 7b illustrate the nozzle of FIGS. 3 to 5 during soldering operations.
Figure 6:
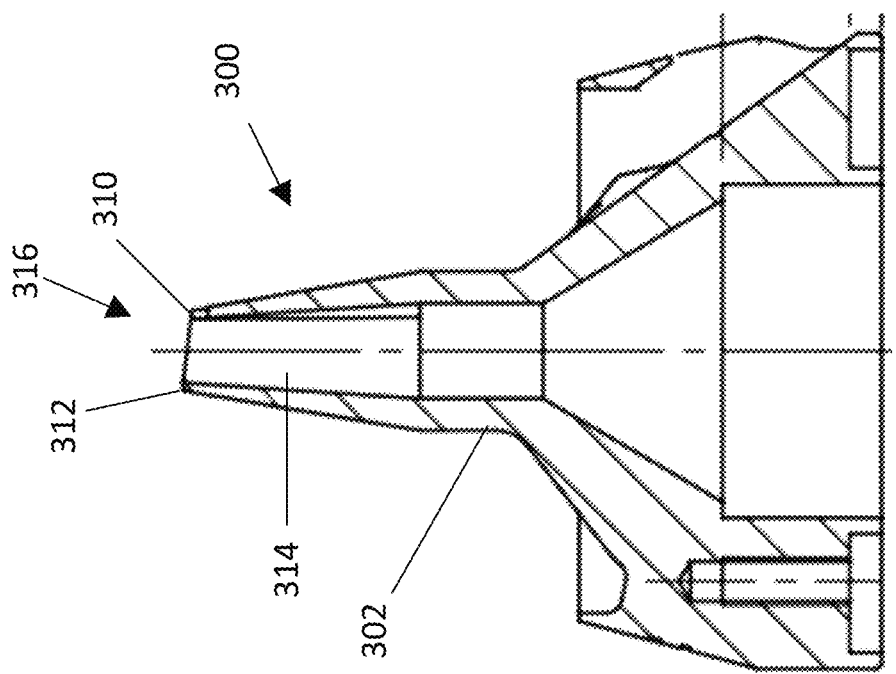
FIG. 6 illustrates a cross-section of the nozzle of FIGS. 3 to 5.

FIG. 7a illustrates an example of a soldering operation on a PCB 800 using the nozzle 300. In this example, the over-flow section 310 has been selected as the preferred over-flow section when soldering a row of pins 801.

It may be required to adjust the relative orientation and/or position between the nozzle and the PCB prior to a soldering operation such that, during the soldering operation, the PCB will be soldered using the stream of solder produced as solder flows over the preferred over-flow section. In other words, the relative orientation and/or position between the nozzle and the PCB may be adjusted to align the connector pins of the PCB with the solder over-flowing from the preferred over-flow section (considering the direction of relative movement between the PCB and nozzle during the soldering operation). As an example, considering the pins 801 in FIG. 7a, once the over-flow section 310 has been selected as the preferred over-flow section, adjustment of the relative position and orientation between the nozzle and the PCB may be required to align the pins 801 with the stream of solder flowing over the over-flow section 310.

In some examples, the relative orientation between the nozzle and the PCB is adjusted by tilting the nozzle axis and/or the PCB to change the angle therebetween. That is, the nozzle may be tilted relative to the PCB and/or the PCB may be tilted relative to the nozzle.

In this example, relative orientation between the nozzle 300 and the PCB 800 is adjusted by tilting the PCB 800 relative to the nozzle 300 (which remains vertical). In other words, the PCB 800 is tilted away from a horizontal plane. Tilting the PCB benefits the soldering process by utilising gravity forces, allowing solder to drain better with less risk of a bridge.

In some examples, the relative orientation between the nozzle and the PCB is adjusted by rotating the nozzle about its axis. That is, with the PCB in a fixed position, the nozzle is rotated about its longitudinal axis to adjust the relative orientation therebetween. In this example, the nozzle 300 has been rotated until the path of solder flowing over the preferred over-flow section 310 is substantially aligned with the direction of movement of the nozzle 300 relative to the PCB 800.

In this example, the nozzle 300 is moved parallel to the PCB 800 (see arrow 1000) to dip the connector pins into the over-flowing solder. In particular, the nozzle moves down, but parallel to, the slope of the PCB 800. That is, the displacement of the nozzle relative to the PCB has both a horizontal and vertical component. Specifically, to allow the connector pins of the PCB 800 to be dragged through the over-flowing solder (despite the relative angle between the non-horizontal PCB 800 and the vertical nozzle), the elevation of the nozzle is adjusted during the soldering operation.

In some situations, it may be required that some sections of the PCB are soldered with a stream of solder of a first width, and other sections of the PCB are soldered with a stream of solder of a second width. For example, connector pins of different types/sizes may be soldered with solder streams of different thickness. Similarly, smaller solder streams may be required depending on the arrangement of connector pins on the PCB (for example double row connectors may require finer soldering pitch). As an example, a first set of pins may require a solder width of about 2 mm and a second set of pins on the same PCB may require a solder width of 6 mm.

Referring back to the example of FIG. 7a, following the soldering of pins 801, the selection process may be repeated based on the required width of solder preferred for soldering pins 803. If required (for example if the preferred over-flow section for the pins 803 is not the same as the preferred over-flow section for the pins 801), the relative orientation between the nozzle and the PCB may be adjusted prior to the further soldering operation.

Figure 7B:
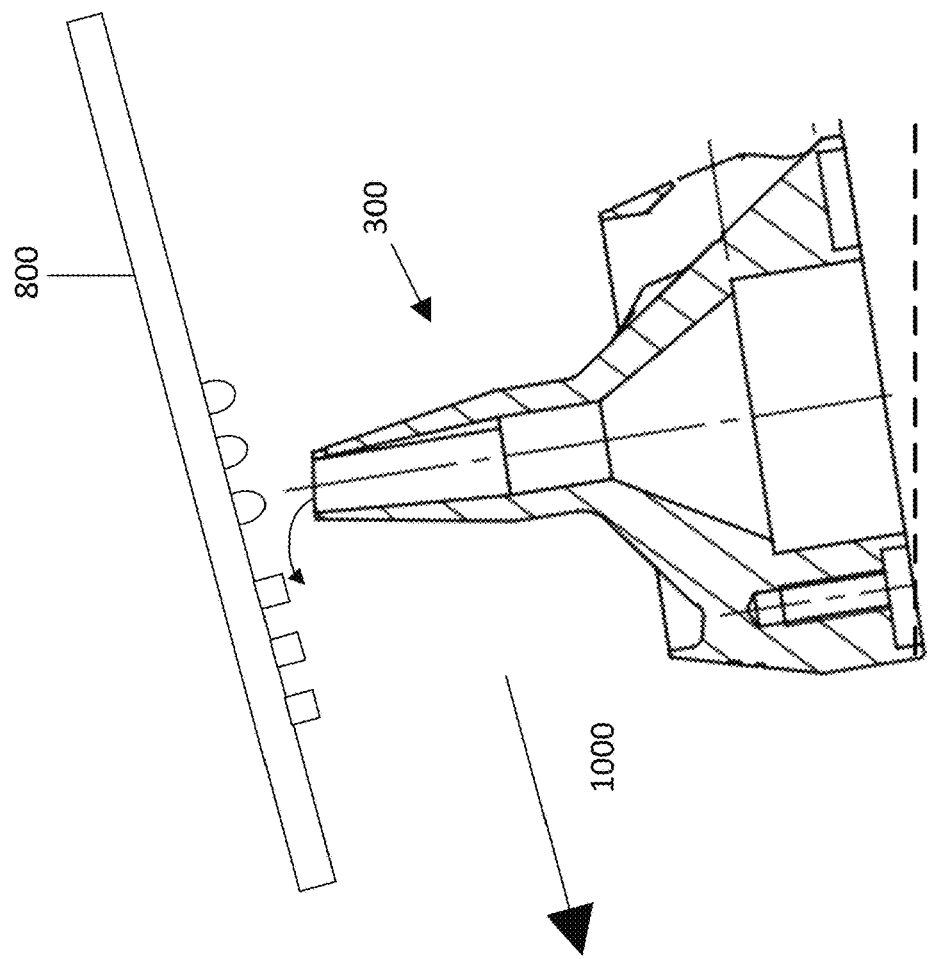

In this example, the over-flow section 312 is selected as the preferred over-flow section for soldering the pins 803. FIG. 7b illustrates the PCB 800 and nozzle 300 following rotation of the nozzle 300 around its axis. In this example, as the over-flow sections 310, 312 are located on opposing sides of the outlet 316, the nozzle is rotated by 180 degrees to switch use from over-flow section 310 to over-flow section 312. In other examples, the amount of rotation will depend on the relative positioning of the over-flow sections.

In this example, the relative orientation between the nozzle 300 and the PCB 800 is also adjusted by tilting the nozzle 300 relative to the PCB 800. In other words, the nozzle axis is tilted from vertical. This helps the flow of solder to overcome the natural preferential flow over over-flow section 310 (due to the slope of the outlet). However, in other examples without such preferential flow tilting the nozzle may not be required.

Depending on the relative position between successive connector pins to be soldered, there may be also an adjustment in the relative position between the PCB and nozzle before the relative orientation between the nozzle and the PCB is adjusted. For example, if the rows of pins 801 and pins 803 were located at different parts of the PCB (as opposed to being aligned) the PCB and/or nozzle may be translated to reposition the PCB and/or nozzle.

The combination of the tilt of the PCB and the rotation of the nozzle, helps reduce the necessity for switching solder pots/nozzles in use when using fine pitch soldering, for example when soldering double row connectors.

To adjust the relative position and orientation between the nozzle and the PCB, the system further includes actuating means. The actuating means may, as required, be configured to rotate the nozzle about its axis and/or tilt the nozzle axis and/or the PCB to change the angle therebetween and/or to adjust the relative position of the PCB and the nozzle.

Any suitable actuating means may be used for example, electrical or mechanical actuators. It would be understood that the actuating means may include a single actuating means (for example including individual actuators, each actuator configured to provide a specific adjustment of position/orientation) controlled centrally, for example by a controller. In other examples, the actuating means may include a number of separate actuators, each controlled and operated separately.

Figure 8:
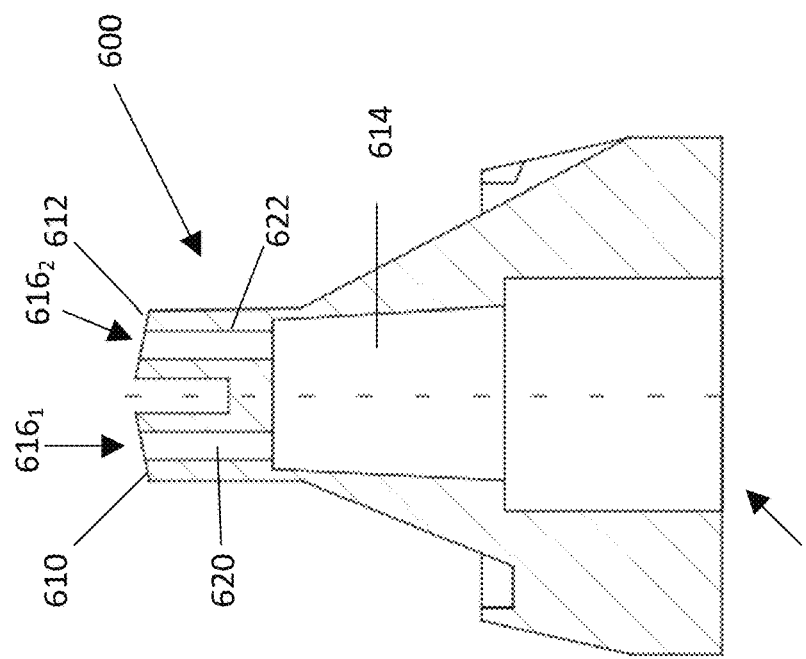
FIG. 8 illustrates a cross-sectional view of another example of a nozzle for directing a stream of solder during a solder operation.
Figure 9A:
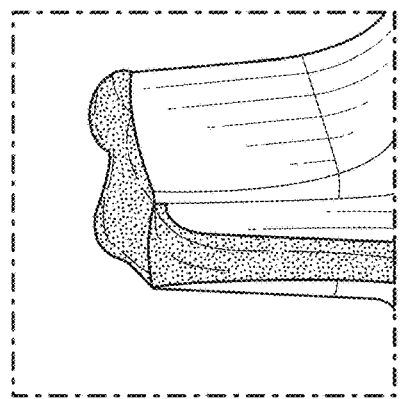
FIGS. 9a and 9b illustrates perspective views of the nozzle of FIG. 8 during a soldering operation.
Figure 9B:
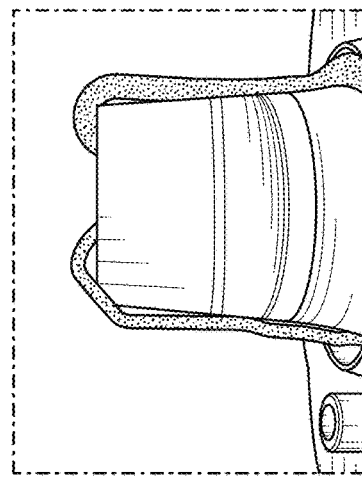

FIGS. 8, 9a and 9b illustrate another example of a nozzle 600 for directing a stream of solder during a soldering operation. Nozzle 600 includes many common features with the nozzle 300 of the previous example, with like components being labelled in the same manner, however with prefix 6-. The nozzle 600 is suitable for use in the same system as described for previous examples and is operated in substantially the same manner.

In this example, the outlet portion includes more than one outlet. In this particular example, the outlet portion includes two outlets $616_{1\text{-}2}$. That is, the outlet portion includes two distinct outlets from which solder is dispensed during a soldering operation. In other examples, any number of outlets may be used, for example 3, 4 or more outlets.

In this example there is an over-flow section 610, 612 associated with each outlet $616_{1\text{-}2}$, however in other examples, each outlet $616_{1\text{-}2}$ may include more than one over-flow section. In this example, the over-flow section of each outlet is connected to the corresponding outlet. In particular in this example, the over-flow sections are sections of the peripheral edge of the corresponding outlet.

In this example, the nozzle 600 includes channels 620 and 622, with each channel fluidly coupling a corresponding outlet $616_{1\text{-}2}$ to the inlet 604. In this example, the channels 620 and 622 fluidly couple the corresponding outlets $616_{1\text{-}2}$ to the inlet via a common channel 614. However, in other examples each channel may extend independently from the inlet 604 to the corresponding outlet $616_{1\text{-}2}$.

The use of more than one channel in the nozzle allows more controlled flow of the liquidus solder. For example, as indicated with the previous example, when using a single channel with multiple over-flow sections, the solder will take the path of least resistance (for example, the solder will generally flow over the lowest over-flow section). This may result in a high flow over one over-flow section and almost no flow over another over-flow section. As such, the nozzle may need to be tilted towards the non-preferential over-flow section when required. Including separate supply channels for each outlet and/or each over-flow section allows greater control over the path the solder takes. In some examples, one or more of the channels may have a restriction element located within the channel, for example a screw or similar, to restrict/control the flow therethrough. In some examples, the channels may be manually closed if the corresponding outlet or over-flow section is not in use (and then re-opened when required).

Figure 10A:
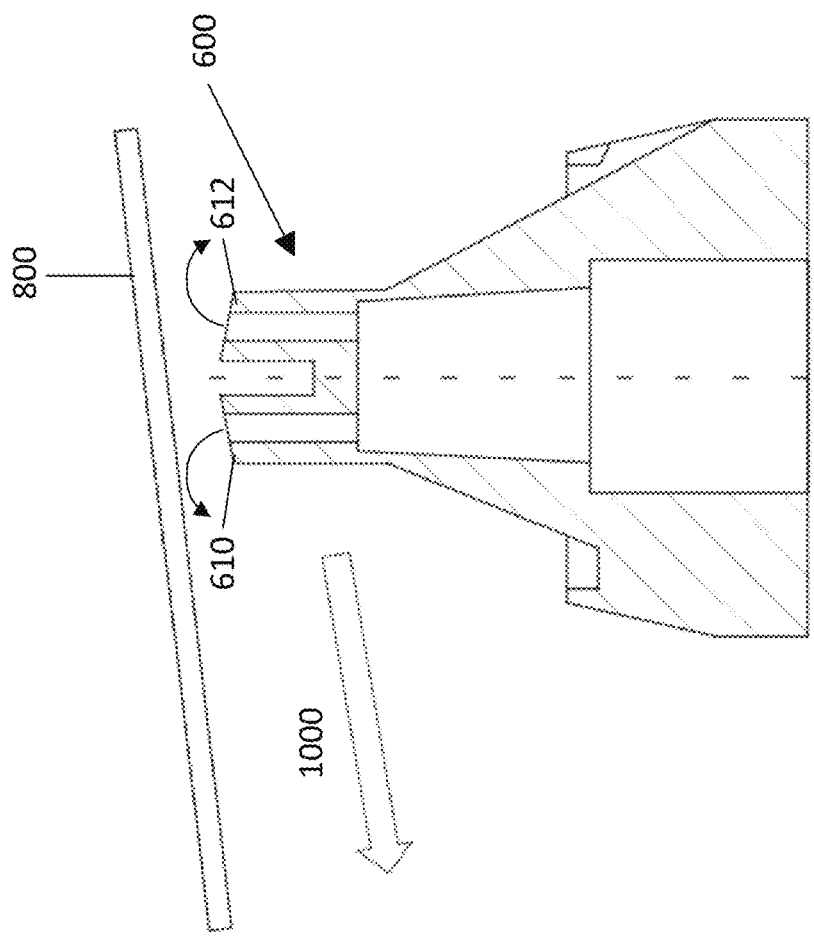

In this example, as shown in FIGS. 9a and 9b, in use solder flows over each over-flow section 610, 612 simultaneously to produce two distinct solder streams. FIGS. 10a and 10b illustrate the nozzle 600 being used in soldering operations. Specifically, FIG. 10a illustrates the nozzle 600 in use when the over-flow section 610 is the preferred over-flow section. As with previous examples, the relative orientation between the nozzle 600 and the PCB 800 is adjusted by tilting the PCB 800 relative to the nozzle 600 (which remains vertical). In this example, the PCB 800 is tilted in a manner such that the when the nozzle 600 is moved parallel to the PCB 800 (see arrow 1000), the connector pins are dipped into the solder over-flowing from the preferred over-section only (i.e. over-flow section 610). In other words, the PCB 800 is tilted towards the preferred over-flow section. The tilt of the PCB 800 prevents the connector pins from being dipped into the solder stream flowing over the non-preferred over-flow section 612.

FIG. 10b illustrates the nozzle 600 in use when the over-flow section 612 is the preferred over-flow section. In this example, the nozzle 600 has been rotated from the arrangement illustrated in FIG. 10a (in this example by substantially 180 degrees) until the path of solder flowing over the preferred over-flow section 612 is substantially aligned with direction of movement of the nozzle 600 relative to the PCB 800. Following the rotation of the nozzle 600, the tilt of the PCB ensures that the connector pins will now be dipped into the solder over-flowing from over-flow section 612 only, without being dipped into the now non-preferred over-flow section 610.

Figure 11:
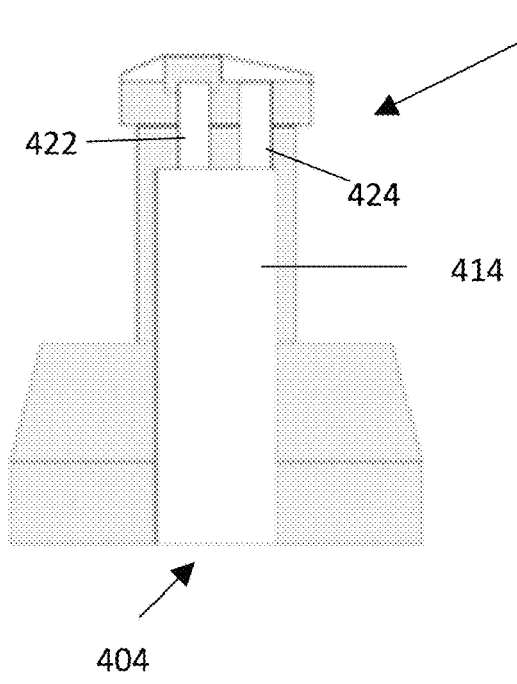
FIG. 11 illustrates a cross-sectional view of another example of a nozzle for directing a stream of solder during a solder operation.
Figure 12A:
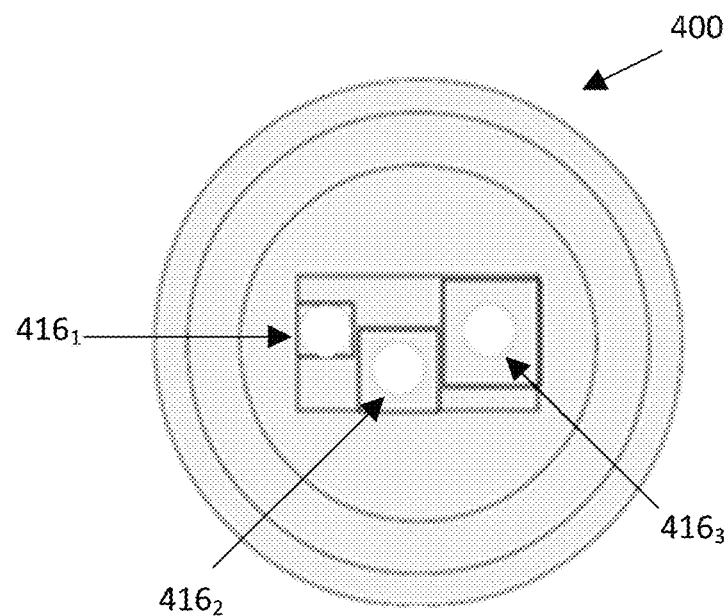
FIGS. 12a and 12b illustrate a plan view of the nozzle of FIG. 11.
Figure 12B:
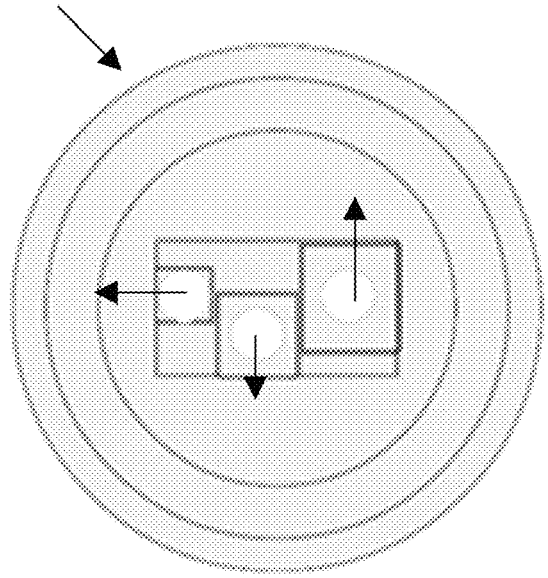

FIGS. 11, 12a and 12b illustrate another example of a nozzle 400 for directing a stream of solder during a soldering operation. Nozzle 400 includes many common features with the nozzles of the previous examples, with like components being labelled in the same manner, however with prefix 4-. The nozzle 400 is suitable for use in the same system as described for previous examples and is operated in substantially the same manner.

In this example, the nozzle 400 includes three outlets $416_{1-3}$, each outlet having a corresponding over-flow section. In particular in this example, each over-flow section includes a surface that extends from the peripheral edge of the corresponding outlet. In use, solder flows from each outlet and over the surface of the corresponding over-flow section. In this example, the nozzle 400 includes three channels 420, 422, 424 (although channel 420 is not visible in the Figures). Each channel 420, 422, 424 fluidly couples a corresponding outlet to the inlet 404, via channel 414.

In this example, the surface of each over-flow section includes a bounding wall or edge, which provides a boundary to solder flowing over the surface of the over-flow section. In other words, the portion of the surface of each over-flow section, over which solder may flow, is bounded by a wall or edge (the distance between the bounding walls at a portion of the surface being the 'width' of the surface). This may help guide the solder thereover and also prevent mixing between the solder being dispensed from the different outlets.

In this example, each over-flow section has a width, different from the widths of the other over-flow sections, such that in use solder flowing over each over-flow section produces a stream of solder with a different width. For example the surface of the over-flow section associated with the first outlet $416_1$ may have a width of from about 1 mm to 4 mm, aptly 2 mm, the surface of the over-flow section associated with the second outlet $416_2$ may have a width of from about 2 mm to 6 mm, aptly 4 mm and the surface of the over-flow section associated with the third outlet $416_3$ may have a width of from about 4 mm to 8 mm, aptly 6 mm.

In this example, the outlet portion has a substantially rectangular profile (as viewed from above), although other profiles are possible. The over-flow sections are spaced around a perimeter of the outlet portion, such that the solder flowing over the over-flow sections are directed in different directions (as shown in FIG. 12b). As such, different widths of soldering stream can be provided by rotation of the nozzle, for example through rotations of 90 or 180 degrees.

Figure 13:
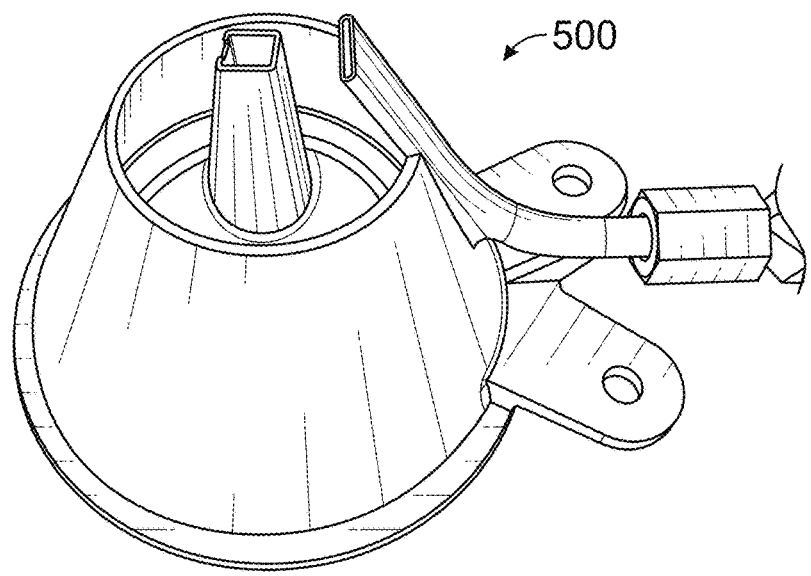
FIGS. 13 and 14 illustrate perspective views of a soldering assembly including a nozzle of FIGS. 3 to 5.
Figure 14:
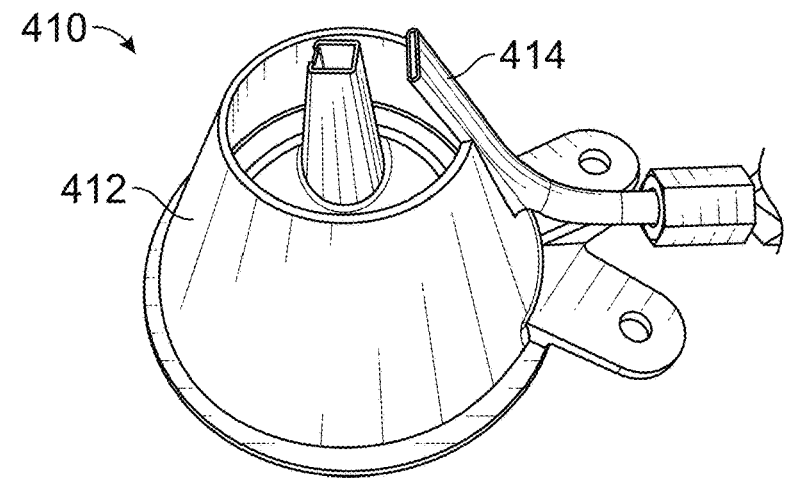
Figure 14:
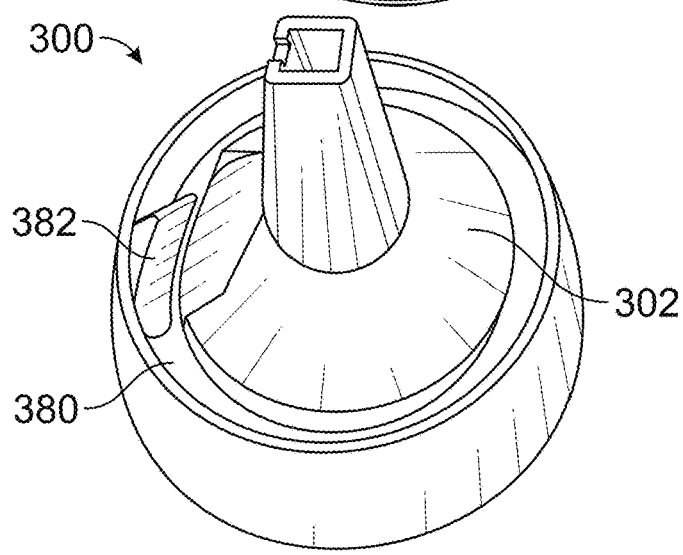

FIGS. 13 and 14 illustrate a soldering assembly 500 including a nozzle 300 for directing a stream of solder during a soldering operation. In the illustrated example, the nozzle 300 corresponds to that illustrated in FIGS. 3 to 6, although in other examples the nozzle of this example may correspond to the nozzle 400, the nozzle 600 or any of the variants discussed herein.

In this example, the soldering assembly further includes a shield assembly 410, including a shield 412, configured to at least partially surround the nozzle 300. In particular, the shield 412 is configured to at least partially surround the sides (i.e. the side wall portion 372) of the nozzle 300, allowing the nozzle to extend through the bore, or hollowed interior, of the shield 412. In this example, the shield 412 has a hollow, truncated cone profile. However, in other examples the shield 412 may have other profiles, for example cylindrical.

In use, the shield 412 is configured to contain splattering of solder from the nozzle 300 and help guide solder from the nozzle 300 back to the solder supply.

In this example, the shield assembly 410 further includes a conduit 414 configured to project, emit or dispense a de-bridging fluid. In this example, The conduit 414 has a first end configured to be coupled to a supply of de-bridging fluid, for example an inert gas stream such as nitrogen. The conduit 414 has a second end positioned proximate to the nozzle outlet 406. In use, the de-bridging fluid is supplied from the fluid supply through the conduit 414 and projected as a stream or jet of de-bridging fluid from the second end of the conduit 414. The supply of de-bridging fluid may be continuous or intermittent (for example, corresponding to the soldering of connector pins). In some examples, the temperature and/or velocity of the stream of de-bridging fluid are adjustable.

The conduit 414 is configured to project the de-bridging fluid to an area proximate to the outlet 316 of the nozzle 300. That is, the jet or stream of de-bridging fluid is directed or angled towards an area proximate to the outlet 316 of the nozzle 300. In doing so, the jet or stream of de-bridging fluid is projected towards components recently soldered by the over-flowing stream of solder dispensed from the outlet. For example, when the soldering assembly is being used to solder connector pins on a PCB, as the connector pins emerge from the over-flowing stream of solder, the connector pins are impinged by the de-bridging fluid. The shield 412 helps provide an inert environment in the solder area. That is, the de-bridging fluid is blown in the solder-pot and will escape along the nozzle. The shield reduces the oxygen level and avoids oxidation during soldering and helps promote the solder wetting.

In this example, in use, the conduit 414 is pointed/angled so as to direct the jet or stream of de-bridging fluid in the opposite direction to the relative movement between the PCB and the nozzle.

In some examples, the conduit (which may or may not be integral with the shield) is rotatable with respect to the nozzle 300. That is, as the nozzle 300 rotates relative to the PCB, the conduit (and in examples also the shield) may remain fixed, such that the jet or stream is redirected (relative to the nozzle) based on the over-flow section in use. In some examples, as the nozzle switches between the use of different over-flow sections, the conduit may remain in a fixed orientation with respect to the PCB and the nozzle only may rotate. In other examples, both the conduit and the nozzle may rotate to some extent. In other words, the conduit may rotate independently of the nozzle.

As the de-bridging fluid impinges the soldered components, bridging between adjacent soldered components (for example, adjacent connector pins within a row of connector pins, soldered in succession) is reduced, or prevented. That is, when the overflowing solder bridges adjacent connector pins, it may become unstable, with this instability being corrected by the impinging de-bridging fluid. In addition, the use of a hot gas (for example nitrogen at a temperature of more than about 230 degrees Celsius, corresponding generally to liquidus temperature of solder) as the de-bridging fluid improves thermal solderability.

In this example, the second end of the conduit is substantially flattened. That is, the conduit has a generally tubular profile, with the second tubular end being flattened to provide a more concentrated flow therefrom.

Modifications

Various modifications to the detailed designs as described above are possible. For example, it would be understood that aspects of the above described examples (and variants thereof) may be combined in any suitable manner. In non-limiting examples the above described nozzles may have any suitable number of outlets, with any suitable number of over-flow sections (of any of the configurations described above) integral with or connected to each outlet. The over-flow sections may arranged at any suitable positions around the periphery of the outlet portion to allow flow thereover.

The nozzles of the described examples may be manufactured in any suitable way. For example, the nozzles may include a plurality of stacked layers, provided so as to define the at least one channel. The stacked layers may, for example, be deposited during an additive manufacturing or 3D printing process. The stacked layers may include stainless steel or titanium, for example. The construction of nozzles in this way (for example through additive manufacturing or 3D printing) allows different shapes and models to be produced that would generally not be possible with milling or drilling machines. As such, nozzles with improved functionality may be produced and/or nozzles that make more efficient use of materials. The 3D printed nozzle may have a suitable coating to improve corrosion resistance (for example a diffusion coating of chromium carbide). The use of 3D printing to produce the nozzles of the described examples, allows such nozzles (with complex geometries including more than one over-flow section) to be produced efficiently.

Similarly, other aspects of the described examples, for example the shield 412, the conduit 414 may be produced during an additive manufacturing or 3D printing process.

In some examples, for example as shown in FIG. 15, the conduit may be integral with the nozzle. For example, the conduit may extend from an end of the nozzle. For example, the conduit may be positioned between the over-flow sections (with FIG. illustrating a conduit 714 extending from a nozzle 700, of the type illustrated in FIG. 8). In this manner, the conduit is suitably positioned to function for both over-flow sections. The conduit may function for both over-flow sections by projecting de-bridging fluid towards both over-flow sections simultaneously. Alternatively, the conduit may be rotatable with respect to the over-flow sections, such that as the nozzle rotates (to switch between use of over-flow sections) it rotates with respect to the conduit and hence the conduit is always aligned with the over-flow section in use.

It would be understood that in 'substantially corresponding' to the width of the first/second over-flow section, the width of the produced stream of solder may be exactly the same as the width of the first/second over-flow section. However, the width of the produced stream of solder may differ slightly from the width of the first/second over-flow section. For example, (in particular if the over-flow section does not include a recessed or stepped portion or a bounding wall) the width of the produced solder stream may be larger or smaller than the width of the corresponding over-flow section. The amount by which it is larger or smaller may vary depending on the output of the pump.

Also, it would be understood that the width of the solder stream may change with distance from the outlet. For example, the over-flow section may guide/restrain the flow of solder over a certain distance only (for example until the solder has flowed entirely, or at least partially, over the over-flow section), after which the width of the solder stream may increase or decrease.

In some examples, the PCB may be horizontal during a soldering operation. In such examples, one or more channels may be closed, such that there is a flow of solder over a single over-flow section only. Alternatively, the PCB may be elevated from the nozzle in such a manner that the connector pins are dragged through the stream of solder which extends highest. The PCB or nozzle may then be tilted to switch the use to another over-flow section.

In some examples, the PCB may be tilted along more than one axis. For example, a PCB defining an −XY plane, the PCB may tilt in either of the X, and Y directions (both positive and negative angles).

In the above described examples, the nozzles remain vertical throughout the soldering operation. However, in other examples, the nozzle may be tilted (that is, the axis of the nozzle may be titled relative to a horizontal plane). In particular, the nozzle may be tilted such that the solder flows over one of the over-flow sections only (i.e. the over-flow section towards which the nozzle is tilted). The nozzle may be rotated along its axis as described above to switch between the use of over-flow sections.

In the above described examples, the PCB is tilted and the nozzle moves down the slope of the PCB during a soldering operation. However, in other examples, the nozzle may move in other ways relative to the PCB. That is, referring back to FIGS. 7*a* and 7*b*, the nozzle may move into or out of the page.

It will be clear to a person skilled in the art that features described in relation to any of the embodiments described above can be applicable interchangeably between the different embodiments. The embodiments described above are examples to illustrate various features of the disclosure.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise. Features, integers, characteristics, compounds, chemical moieties or groups described in conjunction with a particular aspect, embodiment or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A nozzle for directing a stream of solder during a point-to-point soldering operation, wherein the nozzle is configured to rotate about an axis into a first position and a second position, the nozzle comprising:
   a body portion having:
      an exterior surface;
      an inlet configured to receive a supply of solder;
      an outlet portion having one or more outlets, each of which is configured to dispense solder;
      a first guiding portion;
      a second guiding portion; and
      at least one channel fluidly coupling the inlet to the one or more outlets,
   wherein the body portion defines a vertically-extending center axis,
   wherein the outlet portion is located above the inlet,
   wherein the outlet portion has first and second over-flow sections, each over-flow section being integral with, or connected to, a peripheral edge of an outlet of the one or more outlets, wherein the outlet portion is configured to dispense the solder from the one or more outlets and to cause the solder to flow over the first over-flow section and the second over-flow section,
   wherein the first over-flow section has a first width
   wherein the second over-flow section has a second width different than the first width,
   wherein when the nozzle is positioned in the first position, the nozzle is configured to cause the solder to flow over the first over-flow section and not the second over-flow section, and when the nozzle is positioned in the second position, the nozzle is configured to cause the solder to flow over the second over-flow section and not the first over-flow section.

2. The nozzle according to claim 1, wherein the outlet portion has first and second outlets.

3. The nozzle according to claim 2, wherein the first over-flow section is integral with, or connected to, the first outlet and wherein the second over-flow section is integral with, or connected to, the second outlet.

4. The nozzle according to claim 2, wherein the body portion comprises first and second channels, the first channel fluidly coupling the inlet to the first outlet, the second channel fluidly coupling the inlet to the second outlet.

5. The nozzle according to claim 1, wherein at least one of the first over-flow section or the second over-flow section comprises a substantially straight portion in the peripheral edge of the outlet of the one or more outlets.

6. A nozzle according to claim 1, wherein at least one of the first over-flow section or the second over-flow section comprises a recessed or stepped section within the peripheral edge of the outlet of the one or more outlets.

7. A nozzle according to claim 1, wherein the first and second over-flow sections are positioned on opposing sides of the outlet portion.

8. A nozzle according to claim 1, wherein the outlet portion has a third over-flow section integral with, or connected to, a peripheral edge of an outlet of the one or more outlets, wherein at least a portion of the third over-flow section has a third width, as measured along a dimension between the vertically-extending center axis and the exterior surface of the body, wherein the third width is different from the first and second widths, such that in use solder flowing over the third over-flow section produces a stream of solder with a width substantially corresponding to the third width.

9. A nozzle according to claim 8, wherein the over-flow sections are spaced around a perimeter of the outlet portion.

10. A nozzle according to claim 1, wherein the nozzle comprises a plurality of stacked layers, deposited during an additive manufacturing, or 3D printing, process, provided so as to define the at least one channel.

11. A system for soldering a component, comprising:
    a supply of liquid solder;
    a nozzle for directing a stream of solder during a point-to-point soldering operation, wherein the nozzle is configured to rotate about an axis into a first position and a second position, the nozzle comprising:
       a body portion having:
          an exterior surface;
          an inlet configured to receive a supply of solder;
          an outlet portion having one or more outlets, each of which is configured to dispense solder therefrom;
          a first guiding portion;
          a second guiding portion; and
          at least one channel fluidly coupling the inlet to the one or more outlets,
       wherein the body portion defines a vertically-extending center axis,
       wherein the outlet portion is located above the inlet,
       wherein the outlet portion has first and second over-flow sections, each over-flow section being integral with, or connected to, a peripheral edge of an outlet of the one or more outlets, wherein the outlet portion is configured to dispense the solder from the one or more outlets and to cause the solder to flow over the first over-flow section and the second over-flow section,
       wherein the first over-flow section has a first width,
       wherein the second over-flow section has a second width, different than the first width, and
       wherein when the nozzle is positioned in the first position, the nozzle is configured to cause the solder to flow over the first over-flow section and not the second over-flow section, and when the nozzle is positioned in the second position, the nozzle is configured to cause the solder to flow over the second over-flow section and not the first over-flow section;
    a pump apparatus, configured to pump solder from the solder supply to the nozzle; and
    actuating means configured to change an angle of the nozzle to control the width of the stream of solder by controlling which of the first or second over-flow sections receives the overflowing solder.

12. The system according to claim 11, the nozzle having a longitudinal axis, wherein the actuating means are configured to rotate the nozzle about its axis.

13. The system according to claim 11, the nozzle having a longitudinal axis, wherein the actuating means are configured to tilt at least one of the nozzle axis or the component to be soldered to change the angle therebetween.

14. A method of soldering a component, the method comprising:
    providing a system according to claim 11;
    providing a component to be soldered;
    selecting a preferred over-flow section based on the required width of solder;
    adjusting the relative orientation between the nozzle and the component to be soldered such that, during a soldering operation, the component will be soldered using the stream of solder produced as solder flows over the preferred over-flow section; and performing the soldering operation using the system according to claim 11.

15. The method according to claim 14, wherein the relative orientation between the nozzle and the component to be soldered is adjusted by rotating the nozzle about its axis.

16. The method according to claim 14, wherein the relative orientation between the nozzle and the component to be soldered is adjusted by tilting the nozzle axis and/or the component to be soldered to change the angle therebetween.

17. The nozzle according to claim 1, wherein a first flow path from the outlet portion over the first over-flow section has a lower flow resistance than a second flow path from the outlet portion to the second over-flow section when the nozzle is in a vertical upright position.

18. The nozzle according to claim 1, wherein:
the outlet portion comprises a peripheral edge;
the first over-flow section comprises a recessed or stepped section within the peripheral edge;
the second over-flow section is a straight section of the peripheral edge positioned on an opposite side of the outlet portion from the first over-flow section; and
the peripheral edge has first and second straight portions extending between the recessed or stepped section of the first over-flow section and the straight section of the second over-flow section, the first and second straight portions of the peripheral edge being angled with respect to the first over-flow section and the second over-flow section.

19. The nozzle according to claim 18, wherein the second over-flow section extends higher than the first over-flow section when the nozzle is in a vertical upright position, and the first and second straight portions of the peripheral edge extend downward from the second over-flow section to the first over-flow section.

20. The nozzle according to claim 1, wherein the first width of the first over-flow section is between 1 mm and 4 mm, and the second width of the second over-flow section is between 4 mm and 10 mm.

* * * * *